May 20, 1952 C. L. EKSERGIAN 2,597,835
WHEEL MOUNTING
Filed Oct. 7, 1947 2 SHEETS—SHEET 1

INVENTOR
Carolus L. Eksergian
BY [signature]
ATTORNEY

May 20, 1952　　　C. L. EKSERGIAN　　　2,597,835
WHEEL MOUNTING

Filed Oct. 7, 1947　　　　　　　　2 SHEETS—SHEET 2

INVENTOR
Carolus L. Eksergian
BY *Maurice A. Crews*
ATTORNEY

Patented May 20, 1952

2,597,835

UNITED STATES PATENT OFFICE 2,597,835

WHEEL MOUNTING

Carolus L. Eksergian, Media, Pa., assignor to The Budd Company, Philadelphia, Pa., a corporation of Pennsylvania Application October 7, 1947, Serial No. 778,390

2 Claims. (Cl. 301—9)

The invention relates to wheels, and more particularly to mounting means for securing single or interchangeable dual wheels to a radial hub flange.

The invention is more particularly concerned with improvements on the wheel mounting disclosed and claimed in United States Patent #2,195,589 for "Dual Wheel Mounting," issued April 2, 1940.

According to the patented construction, the radial hub flange is provided with an annular series of securing studs projecting outwardly of the flat outboard face of said flange. The wheel bodies for securement to said flange, either singly or as duals, are dished discs each provided with a radially extending mounting portion provided with an annular series of holes corresponding in number and circumferential spacing to the series of securing studs. Surrounding the studs, the outboard face of the hub flange is formed with re-entrant seats, shown to be of generally frusto-conical form, and the wheel body or bodies are correspondingly constructed so they may be mounted flatwise against the flat outboard face of the hub flange, the wheels being adapted to be interchangeable and mounted either singly or as a pair of duals.

To this end, the wheel bodies are formed, surrounding the holes therein, with alternate in- and out-coined bosses which are also of generally frusto-conical form so that the in-coined bosses of a wheel mounted singly or the in-coined bosses of the inner wheel of a pair of duals have internesting engagement with the associated re-entrant seats on the hub flange to center the wheel bodies on the hub and form a driving engagement between the wheel or wheels and the hub. The corresponding bosses on the pair of duals also internest to center the outer wheel on the inner and form a driving engagement between them. On the outboard face of the mounting portion of a singly mounted wheel or on the outboard face of the outer wheel of dually mounted wheels, are formed re-entrant seats, also of generally frusto-conical form, which are engaged in internesting relation by similarly shaped protuberances on nuts screwed onto the respective studs, and, when the nuts are tightened on the studs, the wheel or wheels are firmly clamped together and to the hub flange and locked to the hub in centered and driving relation by the tension stress of the studs. The studs are loosely received with considerable play in the holes in the wheel body, so that no direct engagement between the studs and wheel bodies takes place.

This form of mounting has been found very efficient in service, particularly for wheels of light trucks, where the studs are not subjected to excessively high stresses. It requires, however, for best performance, a degree of manufacturing accuracy, which is difficult, if not impossible, to attain in practice, without excessive costs.

If, for example, there is a slight misalignment of the stud and the re-entrant seat on the wheel body engaged by the associated nut, as shown, for example, in Figure 4, representing the prior art construction, and such misalignment it is not practical to avoid altogether in the low-cost quantity production of such wheels, then it will be seen that the tightening of the nut will subject the stud to a bending stress, which, particularly if the wheel is one used for heavy duty trucks and busses, may result in eventual failure of the stud. Similarly, if the stud should happen to be cocked at a slight angle, the tightening of the stud would also result in placing such undesired bending stress on the stud.

It is an object of the invention to permit such slight deviations from perfection necessitated by practical manufacturing considerations and yet provide for the secure attachment of a wheel body or wheel bodies to the hub flange without subjecting the studs to such undesired bending stresses, thereby insuring longer life of the mounting, increased safety, and rendering the mounting equally practical for both light and heavy truck or bus wheels, either as singles or as duals.

This object is attained in large measure by providing a construction which permits the nuts or parts thereof to float laterally with respect to the wheel body or bodies, in case of misalignment of the stud and the seat on the wheel body or bodies through which the associated nut transmits its clamping pressure. In other words, a construction is provided in which the nut is not relied on to provide a driving and centering function, this being taken care of by the interlocked seating engagement between the wheels and the hub flange, the nut merely clamping the parts into firm interlocked engagement, by subjecting the stud to tensile stresses to the exclusion of bending stresses.

The manner in which this object is attained will become more fully apparent from the following detailed description when read in connection with the drawings forming a part of this specification.

Figure 2:
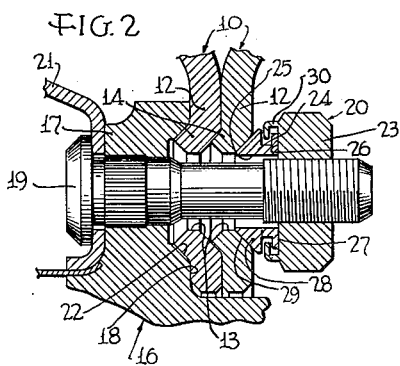
Figures 2 and 3 are enlarged detail sectional views taken, respectively, through the axes of alternate ones of the mounting studs and nuts of a dual wheel mounting.
Figure 3:
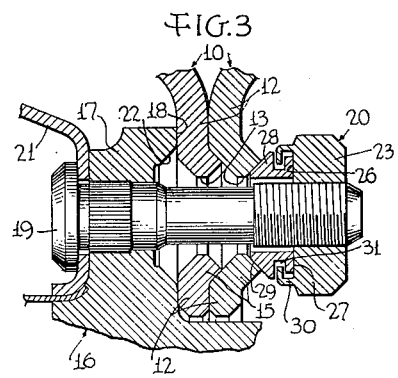
Figure 4:
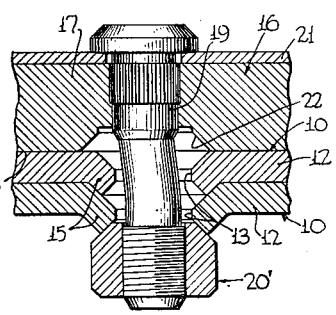
Figure 7:
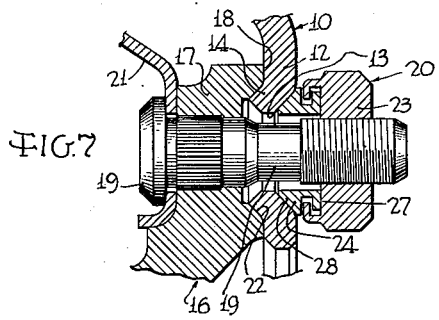
Figure 8:
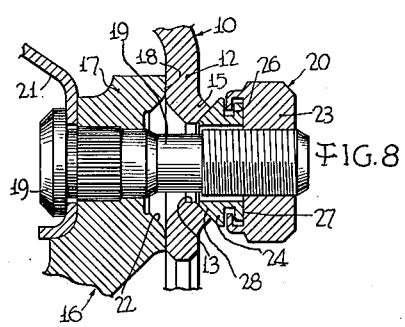
Figure 5:
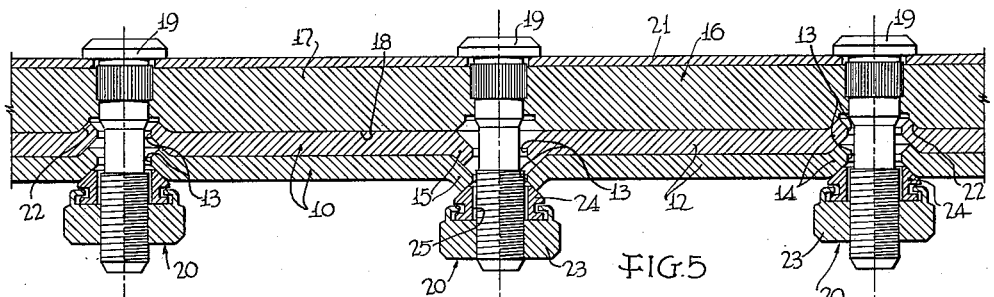
Figure 6:
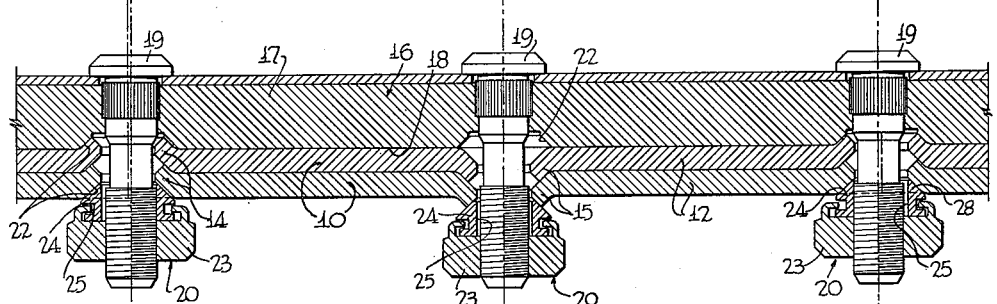
Figure 10:
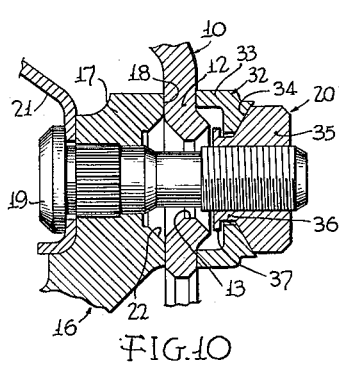
Figure 11:
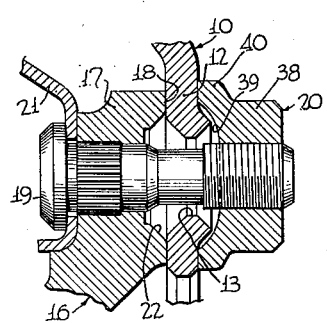
Figure 9:
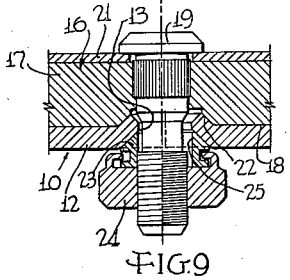

Figure 4 is an enlarged detail sectional view through the axis of a mounting stud and nut, showing a form of misalignment of the stud and nut seat on the wheel body, the arrangement being such as may happen within practical manufacturing tolerances in the construction shown in the prior art patent above referred to, this view showing, in somewhat exaggerated manner, how the stud would be subjected to undesirable bending stresses;

Figure 5 is a detail sectional view of the mounting on the bolt circle extending through three successive studs and nuts, showing a condition which would obtain if all the parts secured together were perfectly aligned, a condition not always obtainable under practical manufacturing conditions;

Figure 6 is a view similar to Figure 5 showing a condition which sometimes obtains under such practical manufacturing conditions, two forms of misalignment being indicated at the right- and left-hand studs in comparison with the showing in Figure 5, center lines of the corresponding studs and/or wheel seats being indicated in dot-and-dash lines;

Figures 7 and 8 are views similar, respectively, to Figures 2 and 3, but showing the invention applied to the mounting of a single wheel body on a hub flange;

Figure 9 is a detail sectional view similar to the right-hand portion of Figure 6, showing a single wheel body mounting with misalignment similar to that shown in this portion of Figure 6;

Figure 10 is a detail sectional view similar to Figure 8 showing a modified arrangement of the mounting as applied to a single wheel body; and Figure 11 is a view similar to Figure 10 of a second modification.

Figure 1:
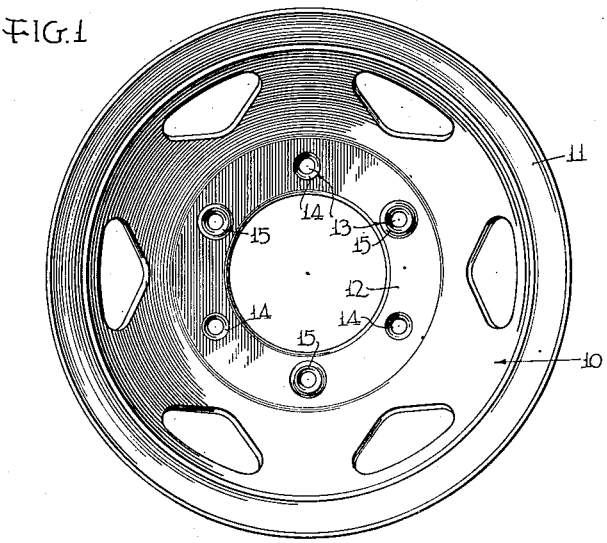
Figure 1 is an elevational view of the outboard face of a wheel body, to the mounting of which, either singly or dually, on the hub flange, this invention relates.

In all the drawings, the wheel bodies, being identical dished discs, whether used singly or as duals, are designated generally by the reference numeral 10, and carry the tire rim 11, Figure 1, in a usual manner, on their outer peripheries. Surrounding a central opening, each wheel body has a generally radially extending mounting portion 12, this mounting portion being provided with an annular series of circumferentially spaced bolt holes 13. The margins of these holes are formed as annular bosses alternately coined in and out and surrounding the respective holes, the in-coined bosses being designated 14 and the out-coined bosses being designated 15.

The hub with which a wheel body or wheel bodies are associated is designated generally by 16 and has a radially extending flange 17 against the flat outboard face 18 of which the wheel body or wheel bodies are adapted to be seated. In the hub flange is secured an annular series of bolting-on means consisting of studs 19 and nuts 20, the studs being secured in a usual manner in the hub flange, clamping the brake drum 21 to the inboard face thereof in a usual manner, and having their outboard ends screw-threaded and projecting beyond the outboard face of the hub flange. The series of studs and nuts are annularly arranged and spaced apart similarly to the series of holes in the wheel body or bodies.

Surrounding each stud 19, or at least each alternate stud, the outer face of the hub flange is formed with a re-entrant seat, in this case shown as a substantially frusto-conical seat 22 with which the in-coined correspondingly shaped bosses 14 of the adjacent wheel body internest to form a centering and driving connection between it and the hub flange. Since the center opening of the wheel body or bodies is spaced from the hub body, see Figures 2 and 3, and the holes in the wheel body or bodies freely receive the bolts with substantial clearance all around, it will be seen that this internested relation provides all the centering and driving between the adjacent wheel body and the hub except for the frictional drive brought about by the high pressure under which the flat face of the mounting portion of the adjacent wheel is forced against the flat outboard face of the hub flange. In the case of dual wheels, as shown in Figures 2, 3, 5 and 6, both the out- and in-coined bosses of the mounting portions of the wheels internest with each other to form a centering and driving connection between the outboard wheel and the inboard wheel. Here again, when the wheel mounting portions of the two wheels are forced together, by the securing studs and nuts, a certain amount of frictional resistance assists in forming a driving connection between the outer and inner wheels.

According to the invention, the studs and nuts are relied upon wholly to tightly clamp the wheel body or wheel bodies (in the case of dual wheels) to the hub flange, thereby stressing the studs in tension, but the arrangement is such that no driving or centering function is assumed by the studs and nuts, and undesirable bending stresses on the studs are thus avoided. This desirable condition is attained according to the form of the invention shown in Figures 2, 3, 5, 6, 7, 8 and 9, by having the nuts 20 divided in a plane transversely of the stud into a nut proper 23 having screw-threaded connection to the stud and a washer-like part 24 having an opening 25 therein loosely receiving the stud. This part 24 has a flat face 26 on its outboard side engaging the flat face 27 on the nut proper, but being free, because of its loose fit on the stud, to float laterally with respect to the nut. The inboard face of the part 24 is former with a protuberance of generally frusto-conical shape 28 adapted to internest with a similar seat 29 formed on both the in- and out-coined bosses of the adjacent wheel body. The nut proper 23 and the washer 24 are kept from separating, when removed from the stud, without interfering with the relative lateral movement between them, by having an undercut flange 30 on the nut loosely received into an annular groove 31 in the washer.

With this arrangement, it will readily be seen from an inspection of Figure 6 (see right and left studs and nuts), and Figure 9, that in case of misalignment of the studs and the re-entrant seats on the wheel body engaged by the nuts, the washer can move laterally with respect to the nut and still provide a good seating for the nut through the washer on the wheel body, and this without imposing objectionable bending stress on the stud. With such misalignment in the prior art structure, as shown in Figure 4, the tightening of the conically faced nut 20' would, as indicated, result in bending the stud.

With the arrangement according to this invention, all misalignment which may ordinarily occur in practical manufacturing conditions of the hub and interfitting wheel body or bodies, is automatically compensated for without bend-stressing the stud, and at the same time a firm interseating between the nut and the re-entrant seat on the outboard face of the adjacent wheel body is maintained.

The same conditions hold whether a single wheel or a dual wheel is bolted to the hub flange, except that in a dual wheel, the conditions which bring about misalignment are aggravated by the greater number of parts which must be clamped together by the nuts and studs, and the corresponding multiplication of the factors which bring about misalignment making the invention more particularly necessary and desirable in such dual wheel mounting, which is also subjected to higher loading.

Referring to the modification shown in Figure 10, while it is shown applied to a single wheel mounting, it will be understood that it is equally applicable, like the preferred form, to a dual wheel mounting. This form differs from the preferred form mainly in having the washer-like part 32 of larger diameter than the bosses on the wheel body and provided with a generally axially extending peripheral skirt 33 engaging the flat face of the wheel body in a zone radially outwardly of the associated boss. This skirt 33 spaces the main body of the washer from the wheel body, providing a re-entrant cut-out portion freely receiving the out-coined bosses of the wheel body, as clearly shown in Figure 10. The outboard face of the washer has a generally frusto-conical seat 34 fitting a similar seat on the nut proper 35. The nut proper has a small-diametered inward extension 36, with which the body of the washer has a loose fit, to permit its lateral floating movement with respect to the nut. The inner end of the reduced extension 36 is provided with a radial flange 37, to prevent the separation of the nut and washer when removed from the stud. Preferably, the generally frusto-conical seats between the nut and washer in this form, and the similar seats between the wheel body and the washer in the preferred form, are slightly spherical to allow the washer to tilt freely with respect to the nut in this form, or the washer to tilt with respect to the wheel body in the preferred form, if the stud is not truly rectangularly related to the outer face of the wheel.

Because of the large-diameter clamping area, this form provides a more powerful clamping action to hold the wheel or wheels on the hub, and at the same time takes care of misalignment without imposing undesirable bending stresses on the stud. Both the forms so far described take care of the condition where the stud is axially misaligned with the associated wheel seat and also with the condition where the stud is slightly cocked at an angle, without imposing undesirable bending strain on the stud. Since the cocking of the stud is a condition not encountered as often as the misalignment of the parts above referred to, a second alternative form of the invention, as shown in Figure 11, may be utilized, which has no provision for avoiding bending of the stud if it is cocked with respect to the outer clamping seat of the wheel. According to this form of the invention, the nut 38 is formed with an undercut recess 39 for receiving the associated out-coined boss and has a peripheral inwardly projecting skirt 40 having a flat-faced engagement with the flat face of the wheel body in an annular zone outwardly of the boss to clamp the wheel body to the hub flange. In this case, because of the flat-faced engagement, the nut can float laterally with respect to the wheel body and without imposing any undesirable bending stress on a misaligned stud. This form, therefore, also takes care of the most important difficulty encountered in the practical manufacture of the wheel of the prior art, as shown in the patent referred to, and in Figure 4 of this application; namely, the axial misalignment of the stud with respect to the clamping seat on the wheel body.

While the invention has been herein described in detail in connection with several alternative forms thereof, it will be understood that further changes and modifications may occur to those skilled in the art without departing from the main features of the invention, and such changes and modifications are intended to be covered by the claims appended hereto.

What is claimed is:

1. In a wheel, a hub having a body and a radially extending bolting-on flange and wheel-securing studs arranged in an annular series secured to said flange and projecting from the outboard face thereof, re-entrant recesses formed in the outboard face of said flange and surrounding at least the alternate ones of said studs, a wheel body having a radially extending mounting portion provided with an annular series of holes corresponding to the series of studs and each hole being adapted to receive a respective securing stud with substantial clearance all around, said mounting portion having alternately in- and out-coined bosses surrounding the respective holes with the in-coined bosses nesting within the re-entrant recesses in the hub flange to center the wheel body on the hub and effect a driving engagement between the wheel body and the hub, and a series of nuts having screw-threaded engagement with the respective studs and adapted to bear against the outboard face of said mounting portion through re-entrant seats on said face to clamp it against the outboard face of said hub flange with the in-coined bosses in nesting engagement with their respective recesses when said nuts are drawn up on said studs, the nuts engaging the respective re-entrant seats through washers received over the studs with substantial clearance to allow appreciable transverse movement with respect thereto and having on the one side protuberances nesting with the respective re-entrant seats on the wheel body and on the other side a flat-faced engagement permitting appreciable movement in a transaxial plane with relation to the respective nuts, whereby the washers may adjust themselves angularly with respect to the wheel body and the nuts and washers are free to float laterally with respect to each other and thereby avoid subjecting the studs, regardless of their alignment with the respective wheel holes, to bending stresses during the drawing up of the nuts on the studs and in the operation of the wheel.

2. In a wheel, a hub having a body and a radially extending bolting-on flange and wheel-securing studs arranged in an annular series secured to said flange and projecting from the outboard face thereof, re-entrant recesses having generally frusto-conical seats therein formed in the outboard face of said flange and surrounding at least the alternate ones of said studs, a wheel body having a radially extending mounting portion provided with an annular series of holes corresponding to the series of studs and each hole being adapted to receive a respective securing stud with substantial clearance all around, said mounting portion having alternately in- and out-coined generally frusto-conical bosses surrounding the respective holes with the in-coined bosses nesting within the frusto-conical seats within the re-entrant recesses in the hub flange to center the wheel body and effect a driving engagement between the wheel body and the hub, and a series of nuts having screw-threaded engagement with the respective studs and adapted to bear gainst the outboard face of said mounting portion through re-entrant generally frusto-conical seats on said face to clamp it against the hub flange, with the in-coined bosses in nesting engagement with the seats within the re-entrant recesses when said nuts are drawn up on the studs, the nuts engaging the respective generally frusto-conical seats on the wheel body through washers loosely fitting over the studs for appreciable transverse movement with respect thereto and having on one side generally frusto-conical protuberances nesting with respective frusto-conical seats on the wheel body and on the other side, a flat-faced engagement permitting appreciable movement in a transaxial plane with relation to the respective nuts, whereby the washers and wheel seats may adjust themselves angularly with respect to each other and the nuts and washers may float laterally with respect to each other to avoid subjecting the studs to bending stresses during the drawing up of the nuts and in the operation of the wheel.

CAROLUS L. EKSERGIAN.

REFERENCES CITED

The following references are of record in the file of this patent:

UNITED STATES PATENTS

| Number | Name | Date |
| --- | --- | --- |
| 1,147,568 | Thomson | July 20, 1915 |
| 1,607,274 | Hecht | Nov. 16, 1926 |
| 1,940,675 | Crowther | Dec. 26, 1933 |
| 1,974,746 | Kuhnen | Sept. 25, 1934 |
| 2,130,392 | Horn | Sept. 20, 1938 |
| 2,169,047 | Horn | Aug. 8, 1939 |
| 2,195,589 | Eksergian | Apr. 2, 1940 |

FOREIGN PATENTS

| Number | Country | Date |
| --- | --- | --- |
| 634,341 | France | Feb. 16, 1928 |